Patented Dec. 15, 1931

1,836,123

UNITED STATES PATENT OFFICE

GEORG KALISCHER AND HEINZ SCHEYER, OF FRANKFORT-ON-THE-MAIN, GERMANY, ASSIGNORS, BY MESNE ASSIGNMENTS, TO WINTHROP CHEMICAL COMPANY, INC., OF NEW YORK, N. Y., A CORPORATION OF NEW YORK

NEW CARBOXYLIC ACIDS OF THE FATTY-AROMATIC SERIES AND PROCESS OF MAKING SAME

No Drawing. Original application filed July 9, 1927, Serial No. 204,660, and in Germany August 11, 1926. Divided and this application filed June 5, 1928. Serial No. 283,127.

This application is a division of our copending application Serial No. 204,660, filed July 9, 1927, which has matured into Patent No. 1,721,560.

Our invention relates to new carboxylic acids of the fatty-aromatic series, which are obtained by heating an unsaturated acid compound of the type

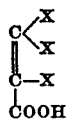

wherein the X's mean hydrogen atoms, which may be replaced by a monovalent substituent such as halogen, akyl, aryl, aralkyl, a further carboxylic group etc., with polycyclic aromatic hydrocarbons containing more than two condensed nuclei, or their substitution products, particularly with trinuclear aromatic hydrocarbons. For obtaining pure condensation products in a good yield it may be advantageous to carry out the reaction with addition of an acid condensing agent such as a hydrogen halide acid or aluminium chloride and for homogenizing the mass of reaction. In some cases it is advisable to work in presence of a diluent. We have further found that instead of using the unsaturated acids themselves one may start from their hydrogen halide addition products being often more easily obtainable, which compounds under the conditions applied in the course of the reaction are converted into the corresponding olefinic carboxylic acids hydrogen halide being split off. In consequence thereof e. g. the same condensation products are obtained when using for the process the acrylic acid as well as α- and β-chloropropionic acid.

In the reaction of the new process the double bond of the unsaturated carboxylic acids probably joins with a double bond of the aromatic hydrocarbon applied.

As polycyclic aromatic hydrocarbons appropriated for the process anthracene, phenanthrene, chrysene and their substitution products may be named, containing in the nuclei one or more nonreactive substituents such as halogens, alkyl, hydroxy-, alkoxy-, aryloxy-, aralkyloxy groups etc.; among the unsaturated acid compounds of the aforesaid type or their equivalent hydrogen halide addition products one may use for our process e. g. the acrylic acid, the α- and β-chloropropionic acid, their homologues and substitution products, such as crotonic acid, chloroacrylic and chlorocrotonic acid, further the arylacrylic acids, their homologues and substitution products such as phenylacrylic acid hydroxyphenylacrylic acid. As starting materials containing a further carboxylic group in their molecule, the maleic acid, the chlorosuccinic acid, etc., may be used. Instead of the carboxylic acids compounds reacting like them such as the acid halides, esters, anhydrides and the like may be used for the process.

The new carboxylic acids of the fatty-aromatic series are when dry whitish to feebly colored crystalline powders, having a definite melting point, being soluble in organic solvents, forming metal salts and derivatives, such as esters, anhydrides, chlorides, most of them being characterized by a characteristic fluorescence of their solutions in alcohol as well as of the aqueous solutions of their sodium salts. They may be used as intermediates for the production of dyestuffs and pharmaceutical products.

In order to further illustrate our invention the following examples are given, the parts being by weight and all temperatures in centigrade degrees, but it is understood, that our invention is not limited to the particular products or reacting conditions mentioned therein.

Example 1

At about 110° 2 parts of anthracene are suspended in 7 parts of acrylic acid and while increasing the temperature slowly to about 170° a current of hydrochloric acid gas is introduced into the mixture for some hours. After cooling down the mass is poured into water and the precipitate is filtered, dissolved in a caustic alkali solution and precipitated again by acidifying the alkaline solution.

The new compound thus obtained corresponds probably to the formula

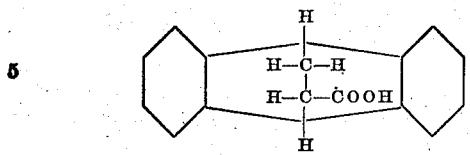

It is easily soluble in the usual organic solvents, its solution in alcohol shows a blue fluorescence, it melts at 187–188° when recrystallized from benzene. It forms a well defined crystalline sodium salt, difficultly soluble in water, characterized by a blue fluorescence of its aqueous solutions.

*Example 2*

A solution of 2 parts of anthracene and 5 parts of β-chloropropionic acid in about 8 parts of dichlorobenzene is heated to the boiling point for about 5 hours. After having driven off the dichlorobenzene with steam the remaining carboxylic acid is purified by dissolving it in a caustic alkali solution and precipitating it therefrom with acids. The compound thus obtained is identical with the product described in Example 1. The same product is obtained when using α-chloropropionic acid.

*Example 3*

A mixture of 10 parts of chloropropionic acid and 3 parts of meso-dichloroanthracene is heated to about 180° for about 3 hours. The mass is poured into water and the product of reaction, which separates at first in a resinous state, is dissolved in a caustic alkali solution and precipitated by acidifying this solution.

The new compound having probably the formula:

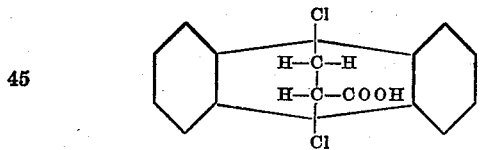

is then obtained as a pure white powder, easily soluble in most organic solvents, its alcoholic solution being characterized by a blue fluorescence melting at 237° after recrystallization from glacial acetic acid.

By using other substitution products of anthracene such as halogenated, alkylated or hydroxyderivatives, similar products are obtained, e. g. by using 1.5-dichloroanthracene, a colorless product, melting at 218°; by using 2.7-dimethylanthracene, a nearly colorless product; melting at about 205°; by using 1-hydroxyanthracene a greyish colored product is obtained soluble in the usual organic solvents and in a sodium carbonate solution with a brownish color forming azocompounds when combined with diazocompounds, e. g. an orange yellow colored product with diazo-p-nitrobenzene.

When replacing anthracene by other condensed polycyclic aromatic hydrocarbons, when condensing, for example, in an analogous manner 3 parts of phenanthrene with 10 parts of chloropropionic acid, a new carboxylic acid is obtained containing the phenanthrene residue and melting at 132° when recrystallized from benzene. In the same manner its methyl-isopropylic homologue, i. e. retene, may be used for the process.

We claim:

1. The process which comprises causing a trinuclear aromatic hydrocarbon to interact with a compound having the chemical constitution of a hydrogen halide addition product of an olefinic carboxylic acid and corresponding to the general formula:

wherein X represents hydrogen, halogen, alkyl, aryl, aralkyl or a further carboxylic acid group and Y represents a halogen.

2. The process which comprises causing a trinuclear aromatic hydrocarbon to interact with a compound having the chemical constitution of a hydrogen halide addition product of an olefinic carboxylic acid and corresponding to the general formula:

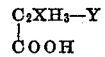

wherein X represents hydrogen or aryl and Y represents a halogen.

3. The process which comprises causing a trinuclear aromatic hydrocarbon to interact with a compound having the chemical constitution of a hydrogen halide addition product of an olefinic carboxylic acid and corresponding to the general formula:

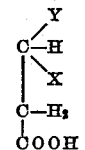

wherein X represents hydrogen or aryl and Y represents a halogen.

4. The process which comprises causing a compound of the anthracene series to interact with a compound having the chemical constitution of a hydrogen halide addition product of an olefinic carboxylic acid and corresponding to the general formula:

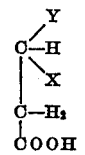

wherein X represents hydrogen or aryl and Y represents a halogen.

5. The process which comprises causing a compound of the anthracene series to interact in presence of a diluent with a compound having the chemical constitution of a hydrogen halide addition product of an olefinic carboxylic acid and corresponding to the general formula:

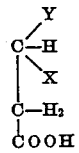

wherein X represents hydrogen or aryl and Y represents a halogen.

6. The process which comprises causing a compound of the anthracene series to interact with β-chloropropionic acid.

In testimony whereof we affix our signatures.

GEORG KALISCHER.
HEINZ SCHEYER.